US008527769B2

(12) United States Patent
Kotla et al.

(10) Patent No.: US 8,527,769 B2
(45) Date of Patent: Sep. 3, 2013

(54) SECURE MESSAGING WITH READ-UNDENIABILITY AND DELETION-VERIFIABILITY

(75) Inventors: Ramakrishna R. Kotla, Sunnyvale, CA (US); Benjamin J. Wester, Ann Arbor, MI (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 13/018,427

(22) Filed: Feb. 1, 2011

(65) Prior Publication Data

US 2012/0198235 A1    Aug. 2, 2012

(51) Int. Cl.
*H04L 9/32* (2006.01)

(52) U.S. Cl.
USPC .......................................................... 713/171

(58) Field of Classification Search
USPC ...................................................... 713/171, 1
See application file for complete search history.

(56) References Cited

U.S. PATENT DOCUMENTS

| | | | | | |
|---|---|---|---|---|---|
| 5,671,279 | A | * | 9/1997 | Elgamal | 705/79 |
| 5,832,220 | A | * | 11/1998 | Johnson et al. | 709/206 |
| 6,115,735 | A | * | 9/2000 | Saito | 709/200 |
| 6,601,088 | B1 | | 7/2003 | Kelley et al. | 709/206 |
| 6,757,713 | B1 | * | 6/2004 | Ogilvie et al. | 709/206 |
| 7,095,859 | B2 | * | 8/2006 | Challener | 380/282 |
| 7,203,962 | B1 | | 4/2007 | Moran | |
| 7,310,660 | B1 | * | 12/2007 | White et al. | 709/206 |
| 7,712,143 | B2 | | 5/2010 | Comlekoglu | |
| 7,921,292 | B1 | * | 4/2011 | Pauker et al. | 713/171 |
| 2002/0035681 | A1 | * | 3/2002 | Maturana et al. | 713/151 |
| 2004/0128498 | A1 | | 7/2004 | Lang et al. | |
| 2004/0250036 | A1 | | 12/2004 | Willman et al. | |
| 2005/0182938 | A1 | | 8/2005 | Seshadri et al. | |
| 2007/0107059 | A1 | | 5/2007 | Chasin et al. | |
| 2010/0088522 | A1 | | 4/2010 | Barrus et al. | |
| 2010/0115625 | A1 | | 5/2010 | Proudler | |
| 2012/0134495 | A1 | * | 5/2012 | Liu | 380/46 |

OTHER PUBLICATIONS

Suh, et al., "Efficient Memory Integrity Verification and Encryption for Secure Processors", Retrieved at << http://www.microarch.org/micro36/html/pdf/suh-EfficMemory.pdf >>, The 36th Annual International Symposium on Microarchitecture, Dec. 3-5, 2003, Pages 12.

(Continued)

*Primary Examiner* — Kambiz Zand
*Assistant Examiner* — Dant Shaifer Harriman
(74) *Attorney, Agent, or Firm* — Microsoft Corporation

(57) ABSTRACT

A cryptographically-secure component is used to provide read-undeniability and deletion-verifiability for messaging applications. When a messaging application of a sending node desires to send a message to a messaging application of a receiving node, the sending node requests an encryption key from the receiving node. The cryptographically-secure component of the receiving node generates an encryption key that is bound to a state of the receiving node. The messaging application of the sending node encrypts the message using the encryption key and sends the encrypted message to the messaging application of the receiving node. Because the encryption key used to encrypt the message is bound to the state associated with reading the message by the cryptographically-secure component, if the receiving node desires to decrypt and read the encrypted message, the receiving node may advance its state to the bound state to retrieve the decryption key.

20 Claims, 6 Drawing Sheets

(56) References Cited

OTHER PUBLICATIONS

Ayrapetov, et al., "Improving the Protection of Logging Systems", Retrieved at << http://www.cs.berkeley.edu/~archanag/publications/privacypaper.pdf >>, 2008, Pages 8.

"Preventing Causality Violations in Decentralized Distributed Systems", U.S. Appl. No. 12/721,576, filed Mar. 11, 2010, pp. 1-23.

"Front Running", Retrieved at << http://en.wikipedia.org/wiki/Front_running >>, Retrieved Date: Oct. 22, 2010, Pages 3.

"Microsoft Outlook", Retrieved at http://office.microsoft.com/ >>, Retrieved Date: Oct. 24, 2010, Pages 2.

"Trusted Platform Module V1.2 Specification", Retrieved at << http://www.trustedcomputinggroup.org >>, Retrieved Date: Oct. 24, 2010, Pages 1.

O'Reilly, Dennis, "Gmail Delivery Errors Divulge Confidential Information", Retrieved at << http://news.cnet.com/8301-13880_3-10438580-68.htm,2010 >>, Jan. 21, 2010, Pages 3.

Arnold, et al., "The IBM PCIXCC: A New Cryptographic Coprocessor for the IBM Eserver", Retrieved at << http://ieeexplore.ieee.org/stamp/stamp.jsp?arnumber=05388875 >>, IBM Journal of Research and Development, vol. 48, No. 3-4, May 2004, pp. 475-487.

Belaramani, et al., "Practi Replication", Retrieved at << http://www.cs.umass.edu/~arun/papers/PRACTI.pdf >>, 3rd Symposium on Networked Systems Design and Implementation, NSDI, May 8-10, 2007, Pages 14.

Birrell, et al., "A Design for High-performance Flash Disks", Retrieved at << http://citeseerx.ist.psu.edu/viewdoc/download?doi=10.1.1.146.3221&rep=rep1&type=pdf >>, ACM SIGOPS Operating Systems Review—Systems work at Microsoft Research, vol. 41, No. 2, Apr. 2007, Pages 6.

Carvalho, et al., "Preventing Information Leaks in Email", Retrieved at << http://www.cs.cmu.edu/~wcohen/ postscript/sdm-2007-leak.pdf >>, Proceedings of the Seventh SIAM International Conference on Data Mining, Apr. 26-28, 2007, Pages 10.

Chun, et al., "Attested Append-only Memory: Making Adversaries Stick to their Word", Retrieved at << http://citeseerx.ist.psu.edu/viewdoc/download?doi=10.1.1.101.4798&rep=rep1&type=pdf >>, ACM SIGOPS 21st Symposium on Operating Systems Principles, Oct. 14-17, 2007, Pages 16.

Gauthierdickey, et al., "Low Latency and Cheat-proof Event Ordering for Peer-to-peer Games", Retrieved at << http://citeseerx.ist.psu.edu/viewdoc/download?doi=10.1.1.59.3107&rep=rep1&type=pdf >>, Network and Operating System Support for Digital Audio and Video, 14th International Workshop, NOSSDAV, Jun. 16-18, 2004, Pages 6.

Haeberlen, et al., "PeerReview: Practical Accountability for Distributed Systems", Retrieved at << http://www.sosp2007.org/papers/sosp118-haeberlen.pdf >>, ACM SIGOPS 21st Symposium on Operating Systems Principles, Oct. 14-17, 2007, Pages 14.

Ho, et al., "Nysiad: Practical Protocol Transformation to Tolerate Byzantine Failures", Retrieved at << http://www.cs.cornell.edu/home/rvr/papers/nysiad.pdf >>, 5th USENIX Symposium on Networked Systems Design {\&} Implementation, NSDI, Apr. 16-18, 2008, Pages 14.

Kotla, et al., "SafeStore: A Durable and Practical Storage System", Retrieved at << http://www.usenix.org/event/usenix07/tech/kotla/kotla.pdf >>, Proceedings of the 2007 USENIX Annual Technical Conference, Jun. 17-22, 2007, pp. 129-142.

Lamport, Leslie, "Time, Clocks, and the Ordering of Events in a Distributed System", Retrieved at << http://citeseerx.ist.psu.edu/viewdoc/download?doi=10.1.1.142.3682&rep=rep1&type=pdf >>, Communications of the ACM, vol. 21, No. 7, Jul. 1978, pp. 558-565.

Levin, et al., "Trinc: Small Trusted Hardware for Large Distributed Systems", Retrieved at << http://citeseerx.ist.psu.edu/viewdoc/download?doi=10.1.1.148.808&rep=rep1&type=pdf >>, Proceedings of the 6th USENIX Symposium on Networked Systems Design and Implementation, NSDI, Apr. 22-24, 2009, pp. 1-14.

Li, et al., "Secure Untrusted Data Repository (SUNDR)", Retrieved at << http://www.usenix.org/events/osdiO4/tech/full_papers/li_j/li_j.pdf >>, 2007, pp. 121-136.

Lie, et al., "Implementing an Untrusted Operating System on Trusted Hardware", Retrieved at << http://people.csail.mit.edu/leejw/papers/mirror/lie-sosp2003-sub.pdf >>, ACM Symposium on Operating Systems Principles, Oct. 19-22, 2003, Pages 14.

Mahajan, et al., "Effective and Efficient Compromise Recovery for Weakly Consistent Replication", Retrieved at << http://citeseerx.ist.psu.edu/viewdoc/download?doi=10.1.1.148.8567&rep=rep1&type=pdf >>, Fourth EuroSys Conference, Apr. 1-3, 2009, Pages 14.

Mahajan, et al., "Depot: Cloud Storage with Minimal Trust", Retrieved at << http://nms.csail.mit.edu/sys-security/clouddepot.pdf >>, 2010, pp. 1-26.

McCune, et al., "How Low can you go? Recommendations for Hardware-Supported Minimal TCB Code Execution", Retrieved at << http://citeseerx.ist.psu.edu/viewdoc/download?doi=10.1.1.116.6405&rep=rep1&type=pdf >>, in Proceedings of the ACM Conference on Architectural Support for Programming Languages and Operating Systems, (ASPLOS), Mar. 1-5, 2008, pp. 14-25.

McCune, et al., "Flicker: an Execution Infrastructure for TCB Minimization", Retrieved at << http://citeseerx.ist.psu.edu/viewdoc/download?doi=10.1.1.154.453&rep=rep1&type=pdf >>, Proceedings of the ACM European Conference on Computer Systems (EuroSys), Apr. 1-4, 2008, Pages 14.

Ramasubramanian, et al., "Cimbiosys: A Platform for Content-Based Partial Replication", Retrieved at << http://citeseerx.ist.psu.edu/viewdoc/download?doi=10.1.1.146.4476&rep=rep1&type=pdf >>, Technical Report, MSR-TR-2008-116, Aug. 2008, pp. 1-14.

Reiter, et al., "Securing Causal Relationships in Distributed Systems", Retrieved at << http://citeseerx.ist.psu.edu/viewdoc/download?doi=10.1.1.52.5527&rep=rep1&type=pdf >>, 1995, pp. 1-11.

Sarmenta, et al., "Virtual Monotonic Counters and Count-Limited Objects Using A TPM without a Trusted OS", Retrieved at << http://citeseerx.ist.psu.edu/viewdoc/download?doi=10.1.1.135.8086&rep=rep1Mype=pdf >>, 13th ACM Conference on Computer and Communications Security, Oct. 30-Nov. 3, 2006, Pages 15.

Seshadri, et al., "Pioneer: Verifying Code Integrity and Enforcing Untampered Code Execution on Legacy Systems", Retrieved at << http://www.cs.utsa.edu/~shxu/CS6393-Fa112007/presentation/paper-9.pdf >>, ACM SIGOPS 20th Symposium on Operating Systems Principles, Oct. 23-26, 2005, Pages 16.

Sirivianos, et al., "Free-Riding in BitTorrent Networks with the Large View Exploit", Retrieved at << http://citeseerx.ist.psu.edu/viewdoc/download?doi=10.1.1.112.397&rep=rep1&type=pdf >>, 2007, pp. 1-6.

Smith, et al., "Security and Privacy for Partial Order Time", Retrieved at << http://citeseerx.ist.psu.edu/viewdoc/download?doi=10.1.1.38.6683&rep=rep1&type=pdf >>, Apr. 1994, Pages 23.

Spreitzer, et al., "Dealing with Server Corruption in Weakly Consistent Replicated Data Systems", Retrieved at << http://citeseerx.ist.psu.edu/viewdoc/download?doi=10.1.1.35.4119&rep=rep1&type=pdf >>, The Third Annual ACM/IEEE International Conference on Mobile Computing and Networking, Sep. 26-30, 1997, Pages 7.

Suh, et al., "Design and Implementation of the Aegis Single-Chip Secure Processor Using Physical Random Functions", Retrieved at << http://citeseerx.ist.psu.edu/viewdoc/download?doi=10.1.1.112.7319&rep=rep1&type=pdf >>, in Proceedings of the 32nd Annual International Symposium on Computer Architecture, Jun. 2005, pp. 1-12.

Terry, et al., "Managing Update Conflicts in Bayou, a Weakly Connected Replicated Storage System", Retrieved at << http://citeseerx.ist.psu.edu/viewdoc/download?doi=10.1.1.12.7323&rep=rep1&type=pdf >>, 15th ACM Symposium on Operating Systems Principles, Dec. 3-6, 1995, pp. 172-183.

Dijk, et al., "Offline Untrusted Storage with Immediate Detection of Forking and Replay Attacks", Retrieved at << http://people.csail.mitedu/devadas/pubs/ccs-stc07.pdf >>, 14th ACM Conference on Computer and Communications Security, Oct. 29-Nov. 2, 2007, Pages 8.

Yee, et al., "Secure Coprocessors in Electronic Commerce Applications", Retrieved at << http://citeseerx.ist.psu.edu/viewdoc/download?doi=10.1.1.28.5051&rep=rep1&type=pdf >>, in Proceedings of the First USENIX Workshop on Electronic Commerce, 1995, Pages 16.

Yumerefendi, et al., "Strong Accountability for Network Storage", Retrieved at << http://citeseerx.ist.psu.edu/viewdoc/download >>, ACM Transactions on Storage (TOS), vol. 3, No. 3, Oct. 2007, pp. 11:1-11:33.

\* cited by examiner

SECURE MESSAGING WITH READ-UNDENIABILITY AND DELETION-VERIFIABILITY

BACKGROUND

The use of decentralized distributed systems is growing. These systems typically comprise weakly connected nodes and are mostly decentralized. Examples of decentralized distributed systems include online games, messaging applications, cooperative data sharing systems such as peer-to-peer file sharing systems, and weakly consistent replication systems. While the decentralized nature of such systems and weakly connected nodes provide many advantages in distributed networking environments such as the Internet, there are also problems associated with such systems.

One such problem with distributed systems is known as a read-denial attack. In a read-denial attack, a malicious node may read an incoming message and then may falsely claim not to have done so. The node may eventually claim to have read the message, but at a different logical time, or it may claim never to have read the message at all. This type of attack is challenging to prevent because receiving and reading the message happens locally on a node without any outside observer.

Another problem with distributed systems is known as a taint attack. In a taint attack, a node may be considered tainted by information in a message sent to it, even if the message was unwanted and went unread. For sensitive information, especially in legal or financial settings, merely having received confidential information may result in a taint against a user associated with the node. To counter this attack, the node may protect itself by proving that a tainted message was never read, although it may have been received.

SUMMARY

A cryptographically-secure component is used to provide read-undeniability (also referred to as read-indisputability) and deletion-verifiability (also referred to as verifiable-deletion) for messaging applications in a distributed system. A cryptographically-secure component is implemented at each node of the distributed system. When a messaging application of a sending node desires to send a message to a messaging application of a receiving node, the sending node requests an encryption key from the receiving node. The cryptographically-secure component of the receiving node generates an encryption key that is bound to a state of the receiving node that is associated with reading the message. The messaging application of the sending node then encrypts the message using the encryption key and sends the encrypted message to the messaging application of the receiving node. Because the encryption key used to encrypt the message is bound to the state associated with reading the message by the cryptographically-secure component, if the receiving node desires to decrypt and read the encrypted message, the receiving node may first advance its state to the bound state in the cryptographically-secure component to retrieve the decryption key. Alternatively, if the receiving node desires to delete the encrypted message, the receiving node may advance its state to a deletion state associated with the encrypted message, after which the decryption key will no longer be available. The cryptographically-secure component may later generate a state digest that serves as a proof that the receiving node either read or deleted the encrypted message.

In an implementation, a message is generated at a sending computing device. A request for an encryption key is sent from the sending computing device to a receiving computing device through a network. The request includes a message identifier. An encryption key is received by the sending computing device through the network. The encryption key is bound to a state associated with reading the identified message. Whether the encryption key is bound to the state associated with reading the message is verified by the sending computing device. If the state that the encryption key is bound to is the state associated with reading the message, then the message is encrypted using the encryption key by the sending computing device and sent to the receiving computing device through the network. If the state that the encryption key is bound to is not the state associated with reading the message, and error message may be generated.

In an implementation, a request for an encryption key is received from a sending computing device by a receiving computing device through a network. The request includes an identifier of a message. An encryption key is generated by the receiving computing device. The encryption key is generated by a cryptographically-secure component of the receiving computing device and is bound to a state associated with reading the identified message. The generated encryption key is sent to the sending computing device by the receiving computing device. An encrypted message is received by the receiving computing device from the sending computing device. The encrypted message was encrypted by the sending computing device using the encryption key.

In an implementation, if a determination is made to read the encrypted message by the receiving computing device: a state digest is updated by the receiving computing device to a state associated with reading the message, wherein the state digest is stored in the cryptographically-secure component of the receiving computing device; in response to the updating, access to a decryption key is received by the receiving computing device from the cryptographically-secure component; the encrypted message is decrypted by the receiving computing device using the decryption key; and the decrypted message is read by the receiving computing device. A request for proof that the receiving computing device read the message is received from the sending computing device. The state digest is retrieved from the cryptographically-secure component. The state digest is sent to the sending computing device as proof that the receiving computing device read the message.

In an implementation, if a determination is made to delete the encrypted message by the receiving computing device a state digest is updated by the receiving computing device to a deletion state associated with deleting the message, wherein the state digest is stored in the cryptographically-secure component of the receiving computing device. A request for proof that the receiving computing device deleted the message is received from the sending computing device. The state digest is retrieved from the cryptographically-secure component by the receiving computing device. The state digest is sent to the sending computing device as proof that the receiving computing device deleted the message.

This summary is provided to introduce a selection of concepts in a simplified form that is further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
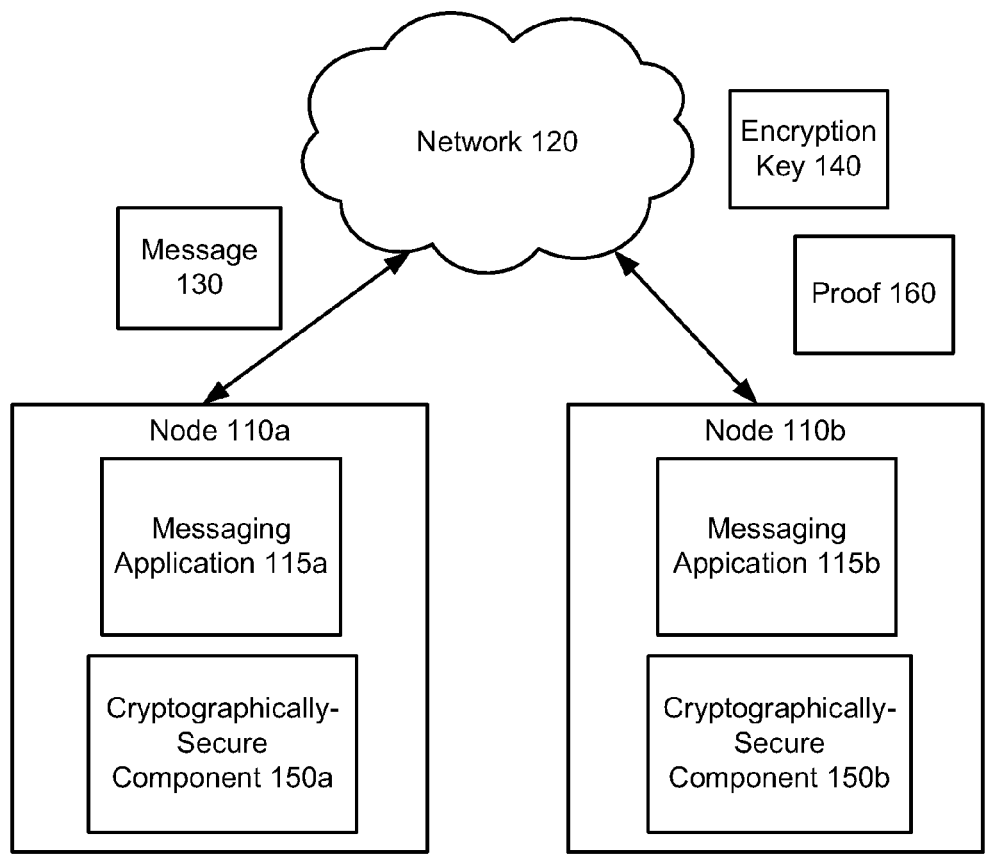
FIG. 1 is an illustration of an example environment for providing read-undeniability and deletion-verifiability in messaging applications of a distributed system.

FIG. 1 is an illustration of an example environment 100 for providing read-undeniability and deletion-verifiability in messaging applications of a distributed system. As illustrated, the environment 100 includes a node 110a and a node 110b in communication with each other through a network 120. The network 120 may be a variety of network types including the public switched telephone network (PSTN), a cellular telephone network, and a packet switched network (e.g., the Internet). The nodes 110a and 110b may be implemented using one or more general purpose computing devices such as the computing device 600 described with respect to FIG. 6, for example.

The nodes 110a and 110b may each execute a messaging application (i.e., messaging applications 115a and 115b, respectively). The messaging applications may be cryptographically-secure messaging applications and may generate and send at least one message 130. Each message 130 may be encrypted using at least one encryption key 140. Examples of messaging applications may include email applications, instant messaging applications, chat applications, social networking applications, or any other type of application where users can exchange and view messages. While only two nodes (i.e., nodes 110a and 110b) and two messaging applications (i.e., messaging applications 115a and 115b) are shown, it is for illustrative purposes only; there is no limit to the number of nodes and messaging applications that may be supported. Moreover, it is contemplated that a single node may execute multiple instances of a messaging application.

The messaging applications 115a, 115b may be distributed messaging applications and may be executed as part of a decentralized distributed system. One feature of decentralized distributed systems is the lack of a centralized authority or application that coordinates the messages sent between the nodes 110a, 110b. Thus, the node 110a may send a message directly to the node 110b and vice versa. Such decentralized messaging is advantageous in an environment like the Internet where connections to the network 120 may be unreliable. Moreover, such decentralized messaging may provide for greater scalability since there is no centralized authority that coordinates all of the communications between the nodes 110a, 110b.

One drawback associated with decentralized messaging systems is the possibility of read-denial attacks and taint attacks. As an example of a read-denial attack, the messaging application 115a of the node 110a may receive a message 130 from the messaging application 115b of the node 110b, read the contents of the message 130, and then claim that it had not read the message 130. As an example of a taint attack, the messaging application 115b of the node 110b may maliciously send a message 130 to the messaging application 115a of the node 115a. The message 130 may include information that a user of the messaging application 115a may not wish to view. For example, the message 130 may include privileged or confidential information that the user associated with the messaging application 115a may not be permitted to view. Because of the decentralized nature of the messaging system, even if the user associated with the messaging application 115a deletes the message 130 without viewing it, there is no way to prove that the user did not view the message 130 before it was deleted, resulting in a taint on the user.

As a solution to attacks such as the above described attacks, each node 110a, 110b may include a cryptographically-secure component (i.e., cryptographically-secure components 150a and 150b, respectively). In some implementations, the cryptographically-secure components may be used by the messaging applications 115a, 115b to provide what is referred to herein as read-undeniability and deletion-verifiability. Read-undeniability may ensure that a node cannot deny that it read a message 130 received from another node. For example, if the messaging application 115a of the node 110a reads a message 130 sent from the messaging application 115b of the node 110b it cannot later claim to have not read the message 130.

Deletion-verifiability may ensure that the nodes cannot lie to other nodes about whether a message was deleted before it was read. For example, if the messaging application 115a of the node 110a deletes a particular message 130 before reading it, no other node can claim that the messaging application 115a of the node 110a in fact read the message before it was deleted.

In some implementations, the cryptographically-secure components 150a, 150b may provide read-undeniability and deletion-verifiability by generating what is referred to herein as a "proof" 160. A node may request a proof 160 from another node to determine if the node read a particular message 130 or deleted the message 130 without reading it. For example, the messaging application 115a of the node 110a may send the messaging application 115b of the node 110b a message 130. At a later time, the node 110a may send the node 110b a request for a proof 160. The cryptographically-secure component 150b of the node 110b may generate the proof 160 and send the generated proof to the node 110a. The node 110a may then determine if the node 110b read or deleted the message 130 without reading it based on the proof 160. Example methods and techniques used by the cryptographically-secure components to generate such proofs are described further below with respect to FIG. 2, for example.

Figure 2:
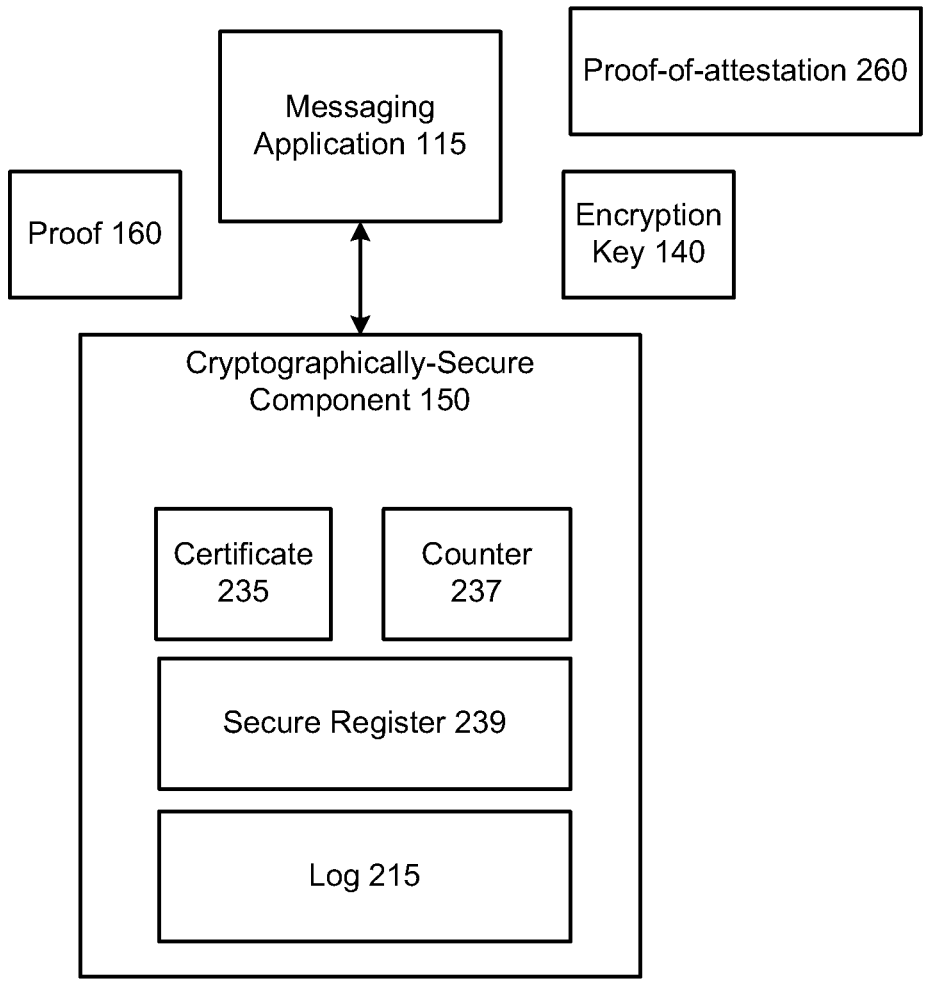
FIG. 2 is a block diagram of an implementation of an example cryptographically-secure component.

FIG. 2 is a block diagram of an implementation of an example cryptographically-secure component 150. The cryptographically-secure component 150 may be a tamper-resistant component in that the contents of the component may not be changeable without using specific methods and/or functions provided by the cryptographically-secure component 150 to a messaging application 115. The cryptographically-secure component 150 may be a hardware component, but it is contemplated that some or all of the aspects of the cryptographically-secure component 150 may be implemented using software, or some combination of software and hardware. In some implementations, the cryptographically-secure component 150 may be a trusted platform module. The trusted platform module may comprise a standard secure co-processor that is found in many computing systems. Other systems and methods for providing a cryptographically-secure component 150 may also be used.

In some implementations, the cryptographically-secure component 150 may include a certificate 235. The certificate 235 may be a cryptographic certificate and may be unique to each cryptographically-secure component 150. Thus, a certificate associated with the cryptographically-secure component 150a may be different from a certificate associated with the cryptographically-secure component 150b. In some implementations, the certificate 235 is provided by a certifying authority and "burnt" into hardware associated with the cryptographically-secure component 150. The certificate 235 may not be spoofed and therefore ensures that a message signed using the certificate 235 originates from the particular cryptographically-secure component 150 associated with the certificate 235.

For example, the cryptographically-secure component 150a of the node 110a may sign each message 130 generated by the messaging application 115a using the certificate 235, and the signed messages may be transmitted to the messaging application 115b of the node 110b. To verify that a message 130 is indeed from the node 110a, the cryptographically-secure component 150b may retrieve the public key associated with the node 110a and decrypt the signature associated with the message 130.

In some implementations, the cryptographically-secure component 150 may further be able to generate additional keys and/or certificates and sign results, state digests of the cryptographically-secure component 150, and other data. These keys may be related to or based on the certificate 235, allowing the keys to be validated by an external entity (e.g., another cryptographically-secure component 150) using a public key associated with the certificate 235 as described above, for example.

The cryptographically-secure component 150 may further include a secure register 239. The secure register 239 may be register that is adapted to store a state digest that describes a succession of states of the messaging application 115. In some implementations, the state digest may be a chained digest such as an SHA1 digest, for example. The state digest may be signed using the certificate 235, or some other certificate or key generated from the certificate 235. The secure register 239 may be a platform configuration register of the trusted platform module, for example.

In some implementations, the secure register 239 may comprise a register that can be updated using a specialized cryptographically-secure operation of the cryptographically-secure component 150. The operation is referred to herein as an extend operation. The extend operation when performed with an identifier of a message 130 "H" replaces the contents of the secure register 239 with the concatenation of the contents of the secure register 239 with the identifier of the message 130. For example, where the secure register 239 is a platform configuration register with a current state digest of $PCR_T$, the extend operation on the secure register 239 replaces $PCR_T$ with $PCR_{T+1}$ that is equal to $SHA1(PCR_T\|H)$. In some implementations, the identifier of the message 130 may be a hash of the message 130. Other identifiers may also be supported.

The cryptographically-secure component 150 may further include a counter 237. The counter 237 may be a secure counter and may be implemented using a non-volatile monotonic hardware counter, for example. In some implementations, the counter 237 may be used to keep a count of the current state of the messaging application 115. Thus, the counter 237 may be updated by the cryptographically-secure component 150 at each extend operation. While only one counter 237 is shown, there is no limit to the number of counters that may be supported by the cryptographically-secure component 150.

As described above, the secure register 239 may include a state digest that is a concatenation of previous states of the messaging application 115. Because the amount of memory available to the secure register 239 is finite, in some implementations, the state digest stored by secure register 239 may be a summary of the states of the messaging application 115, or may only include the most recent states of the messaging application 115. Accordingly, a complete log of the states of the messaging application 115 may be stored in a log 215 of the cryptographically-secure component 150. In some implementations, the log 215 may be stored unencrypted in untrusted memory. If a malicious software application or adversarial node makes a change to a value of the log 215, the state digest stored in the secure register 239 may be used by the cryptographically-secure component 150 to detect the change and potentially reverse the change.

In some implementations, the cryptographically-secure component 150 may be adapted to generate at least one encryption key 140 that is bound to a selected state of the secure register 239 using a bind operation. The encryption key 140 may be generated from the certificate 235, and a message encrypted using such an encryption key 140 may only be decrypted by a cryptographically-secure component 150 when its secure register 239 has a state that is equal to the selected state. The bind operation may be used by the cryptographically-secure component 150 to provide read-undeniability to a message 130 by binding an encryption key 140 to a state digest associated with reading the message 130. The encrypted message 130 may then not be subsequently decrypted by a receiving messaging application 115 until the cryptographically-secure component 150 updates its state in the secure register 239 to the state digests associated with reading the message 130 using the extend operation.

For example, the messaging application 115a of the node 110a may generate a message 130 to send to the messaging application 115b of the node 115b. Before sending the message, the messaging application 115a may request an encryption key 140 from the messaging application 115b. The request may include an identifier of the message such as a hash. The messaging application 115b may then request an encryption key 140 from the cryptographically-secure component 150b that is bound to a state that is associated with reading the identified message 130. The cryptographically-secure component 150b may then generate an encryption key 140 that is bound to the state using the current state digest from the secure register 239 and the certificate 235 using the bind operation. The messaging application 115b may then provide the encryption key 140 to the messaging application 115a. Because the encryption key 140 is bound to the state associated with reading the message 130, the messaging application 115b may not be able to retrieve a corresponding decryption key without changing its state in the secure register 239 to the bound state using the extend operation.

The bind operation may similarly be used by the cryptographically-secure component 150 to provide deletion-verifiability to each message 130. As described above, a received message 130 may not be subsequently decrypted by a receiving messaging application 115 until the cryptographically-secure component 150 updates its state in the secure register 239 to the state digest associated with reading the message 130 using the extend operation. Accordingly, if the messaging application 115 determines to delete the received message without reading the message 130, the messaging application 115 may update its state in the secure register 239 to a state that is different from the bound state using the extend operation. For example, the state may be updated to a deletion state.

Because the state in the secure register 239 is not the bound state, and the counter 237 is advanced as part of the extend operation, the messaging application 115 cannot enter the bound state and the corresponding decryption keys are no longer available from the cryptographically-secure component 150. Thus, the messaging application 115 can no longer read the message 130 even if a user associated with the messaging application 115 reconsiders.

The cryptographically-secure component 150 may be further adapted to generate at least one proof 160. In some implementations, a proof 160 may comprise a state digest such as the state digest stored in the secure register 239. The proof 160 may be provided by a node as proof that a messaging application 115 executing at the node either read a received message 130 or deleted a received message 130 without reading it. The proof 160 may be signed or encrypted using the certificate 235 of the cryptographically-secure component 150 as evidence that the proof 160 was generated by the cryptographically-secure component 150.

As described above, the cryptographically-secure component 150 and the secure register 239 may be tamper proof. Thus, the signed proof 160 provided by the cryptographically-secure component 150 may be evidence that the messaging application 115 associated with the signed proof in fact entered the states indicated by the proof 160 in the order specified. Accordingly, one or more nodes can verify that the messaging application 115 read or deleted a message 130 by verifying whether or not the proof 160 shows that the messaging application 115 entered, or did not enter, a state that was bound to the message 130.

For example, a messaging application 115a may send a messaging application 115b a message 130 that was encrypted using a bound encryption key that was generated by a cryptographically-secure component 150b associated with the messaging application 115b. At a later time, the messaging application 115a may ask the messaging application 115b for proof that the messaging application 115b either read or deleted the message 130. The messaging application 115b may then have the cryptographically-secure component 150b generate a proof 160 comprising a signed state digest taken from the secure register 239 of the cryptographically-secure component. The messaging application 115a may examine the proof 160 to determine if the messaging application 115b ever entered into the state bound to the encryption key indicating that the messaging application 115b decrypted and read the message 130. If the messaging application 115b never entered into the bound state, then the messaging application 115b did not receive access to the decryption key and therefore could not have read the message 130. If the messaging application 115b enters into a state different from the state that indicates that the message was read (for example, to a state that indicates that message was deleted), then the messaging application 115b loses access to the decryption key and therefore will never be able to read the message in future.

In some implementations, cryptographically-secure component 150 may further generate what is referred to as a "proof-of-attestation" 260. The proof-of-attestation 260 may comprise a signed log or digest of the operations that were performed by the cryptographically-secure component 150. The digest may be signed by the secure cryptographically-secure component 150 using the certificate 235. The proof-of-attestation 260 may be presented as proof that a particular instance of the messaging application 115 performed the operations listed in the digest. For example, the proof-of-attestation 260 may be used by another instance of the messaging application 115 to verify that a generated encryption key was bound to a state associated with reading an identified message.

For example, a messaging application 115a may desire to send the messaging application 115b a message 130 and may request an encryption key 140 from the messaging application 115b. The messaging application 115b may use the cryptographically-secure component 150b to generate an encryption key 140 that is bound to a state associated with reading the message 130 as described above. The cryptographically-secure component 150b may further generate a proof-of-attestation 260 that includes a log of the steps taken by the cryptographically-secure component 150b to generate the encryption key. The proof-of-attestation 260 may be provided to the messaging application 115b along with the encryption key 140. The messaging application 115b may use the proof-of-attestation 260 to verify that the encryption key 140 was bound to the correct state.

Figure 3:
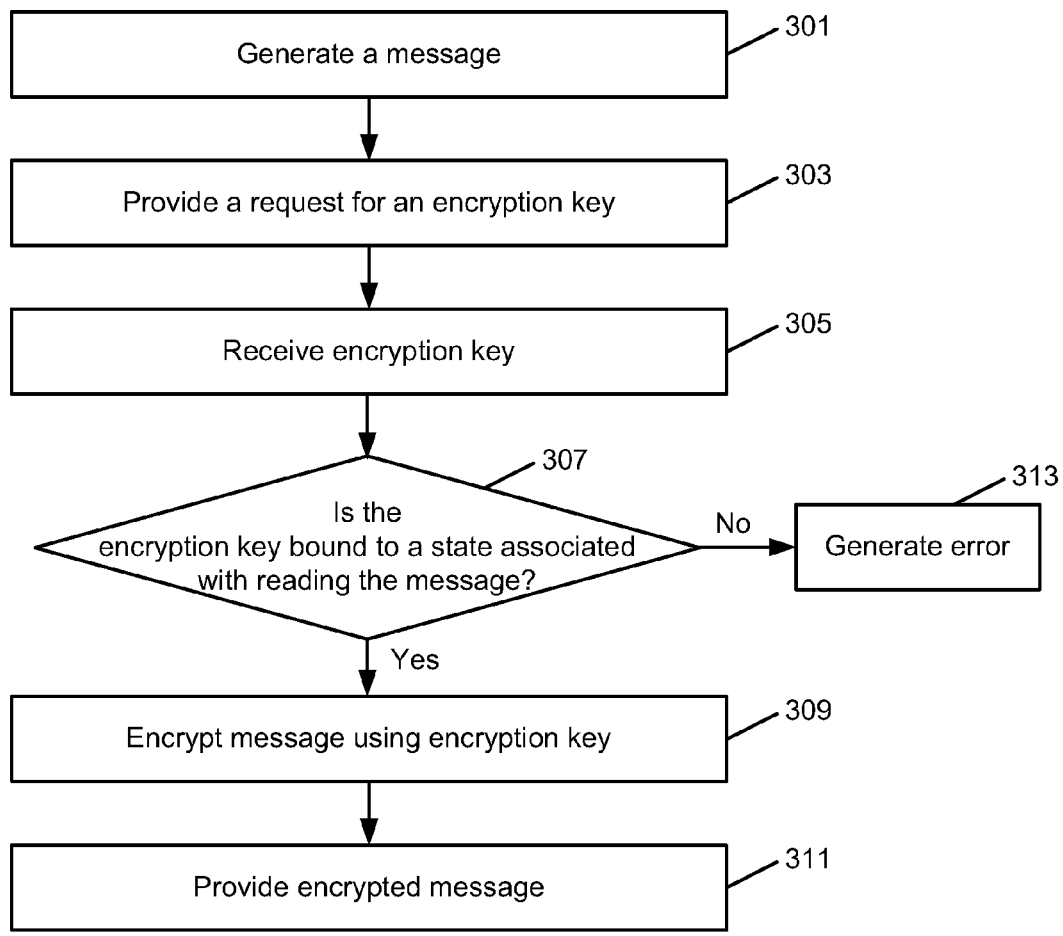
FIG. 3 is an operational flow of an implementation of a method for sending an encrypted message.

FIG. 3 is an operational flow of an implementation of a method 300 for sending an encrypted message. The method 300 may be implemented by one or both of a messaging application 115 and a cryptographically-secure component 150 of a node, for example.

A message is generated at 301. The message 130 may be generated by the messaging application 115a of the node 110a, for example. The message 130 may be an email message or other type of message 130, for example. The message 130 may be a message from a sending node 110a to a receiving node 110b, for example.

A request for an encryption key is sent at 303. The request may be sent by the messaging application 115a of the sending node 110a to the messaging application 115b of the receiving node receiving node 110b. In some implementations, the request may include an identifier of the generated message 130. For example, the identifier may comprise a hash of the generated message.

An encryption key is received at 305. The encryption key 140 may be received by the messaging application 115a of the sending node 110a from the sending node 110b. In some implementations, the encryption key 140 may have been generated by the secure component 150b of the receiving node 110b using a certificate 235. The generated encryption key 140 may be bound to a state associated with the receiving node 110b reading the identified message 130. The generated encryption key 140 may include a proof-of-attestation 260 that proves the encryption key is bound to a state associated with reading the identified message 130. For example, the bound state may be a state that the messaging application 115b would enter after reading the identified message 130.

A determination is made as to whether the encryption key is bound to a state associated with reading the message at 307. The determination may be made by the messaging application 115a of the sending node 110a using the proof-of-attestation 260 included with the encryption key 140. In some implementations, the proof-of-attestation 260 may include a listing of the steps or operations taken by the cryptographically-secure component 150 to generate the encryption key 140.

If the messaging application 115a determines that the encryption key 140 is bound to the state associated with reading the message 130 then the method 300 may proceed to 309. Otherwise, an error may be generated by the messaging application 115a and the message 130 may not be sent to the messaging application 115b of the node 110b at 313.

The message is encrypted using the encryption key at 309. The message 130 may be encrypted by the messaging application 115a of the sending node 110a using the received encryption key 140.

The encrypted message is sent at 311. The encrypted message 140 may be sent by the messaging application 115a of the sending node 110a to the messaging application 115b of the receiving node 110b through the network 120. If the messaging application 115b desires to read the encrypted message 130, the messaging application 115b may then instruct the cryptographically-secure component 150b to use the extend operation to advance its state stored in the secure register 239 to the state bound to the encryption key 140 to receive the decryption key. The decryption key may then be used to decrypt and read the message 130. If the messaging application 115b desires to delete the encrypted message 130 without reading it, the messaging application 115b may then instruct the cryptographically-secure component 150b to use the extend operation to advance its state stored in the secure register 239 to a state associated with deleting the message 130. Because the state in the secure register 239 is not the state associated with reading the message 130, the encrypted message 130 can no longer be read by the messaging application 115b because the necessary bound state cannot be achieved by the secure register 239.

Figure 4:
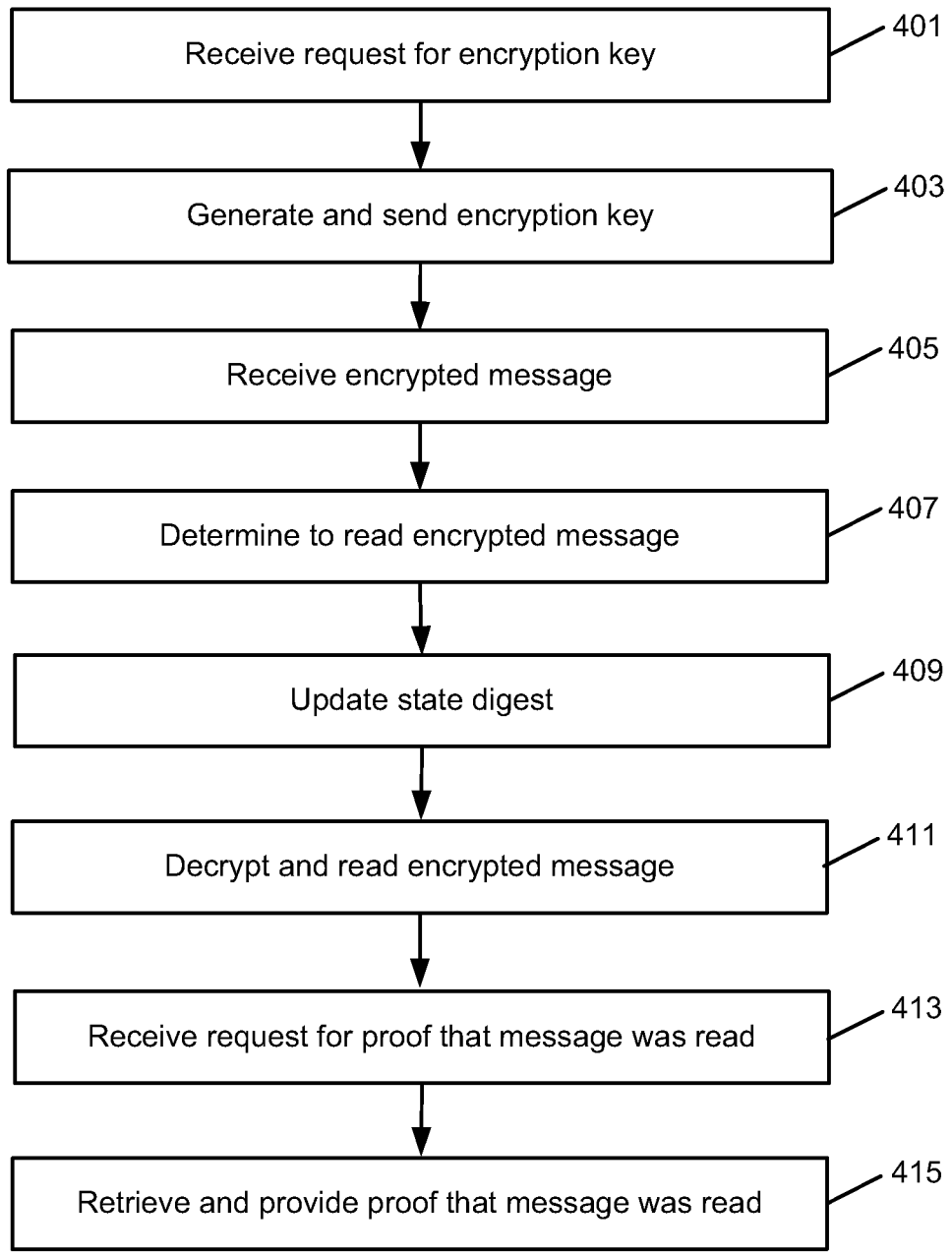
FIG. 4 is an operational flow of an implementation of a method for receiving a message and sending a proof that the received message was read.

FIG. 4 is an operational flow of an implementation of a method 400 for receiving a message and sending a proof that the received message was read. The method 400 may be implemented by one or both of a messaging application 115 and a cryptographically-secure component 150 of a node, for example.

A request for an encryption key is received at 401. The request may be received by a messaging application 115b of a receiving node 110b from a messaging application 115a of a sending node 110a through the network 120. The request may include an identifier of a message 130 that the messaging application 115a intends to send to the messaging application 115b. In some implementations, the identifier of a message 130 may comprise a hash of the message 130. In addition, the message 130 may have been signed using the certificate 235 of the cryptographically-secure component 150a of the sending node 110a.

An encryption key is generated and sent at 403. The encryption key 140 may be generated by a cryptographically-secure component 150b of the receiving node 110b and sent by the messaging application 115b to the messaging application 115a of the sending node 110a through the network 120.

In some implementations, the encryption key 140 may be generated by the cryptographically-secure component 150b by retrieving a current state associated with the messaging application 115b and appending the identifier of the message 130 to the retrieved state using an extend operation. The current state may be retrieved from a secure register 239 associated with the cryptographically-secure component 150b. The current state may be represented by a state digest. The cryptographically-secure component 150b may then generate an encryption key 140 that is bound to a new state that represents a state that the messaging application 115b will enter after reading the identified message 130. In some implementations, the bound state may be determined by appending the hash of the message 130 to the state digest representing the current state. The cryptographically-secure component 150b may further generate a proof-of-attestation 260 that may serve as proof that the encryption key 140 was bound to the new state. The generated proof-of-attestation 260 may be sent to the messaging application 115a of the sending node 110a along with the encryption key 140.

An encrypted message is received at 405. The encrypted message 130 may be received by the messaging application 115b of the received node 110b from the messaging application 115a of the sending node 110a through the network 120. The message 130 may have been encrypted by the messaging application 115a using the encryption key 140. In some implementations, the messaging application 115a may have sent the encrypted message 130 after verifying the generated proof-of-attestation 260.

A determination is made to read the encrypted message at 407. The determination may be made by a user of the messaging application 115b of the receiving node 110b. For example, when the encrypted message 130 was received, the message 130 may have been placed in a mailbox associated with the user. The user may determine to read the encrypted message 130 by clicking, or otherwise selecting, the encrypted message 130 from the mailbox associated with the user.

The state is updated at the 409. The state may be the state of the messaging application 115b and may be updated to reflect the reading of the received message 130 by the cryptographically-secure component 150b. In some implementations, the state may be updated by the cryptographically-secure component 150b using an extend operation. The extend operation may update the state digest stored in the secure register 239. In addition, the counter 237 may be incremented to reflect the new state.

The encrypted message is decrypted and read at 411. The message 130 may be decrypted by the messaging application 115b of the receiving node 110b. After the state was updated, the messaging application 115b may request access to a decryption key from the secure component 150b to decrypt the encrypted message 130. Because the encryption key 140 that was used to encrypt the message 130 was bound to the state associated with reading the message 130, the secure component 150b may grant access to the corresponding decryption key to the messaging application 115b because the state of the node 110b has been advanced to the corresponding bound state. The messaging application 115b may decrypt the encrypted message 130 using the corresponding decryption key.

A request for proof that the message was read is received at 413. The request may be received by the messaging application 115b of the receiving node 110b from the messaging application 115a of the receiving node 110a through the network 120.

The requested proof is retrieved and sent at 415. The requested proof 160 may be sent by the messaging application 115b of the receiving node 110b to the messaging application 115a of the sending node 110a. The messaging application 115b may retrieve the proof 160 from the secure component 150b. In some implementations, the proof 160 may comprise a state digest and may be retrieved from the secure register 239 of the secure component 150b. The proof 160 may be signed using the certificate 235 of the secure component 150b before sending the proof 160 to the messaging application 115b.

Figure 5:
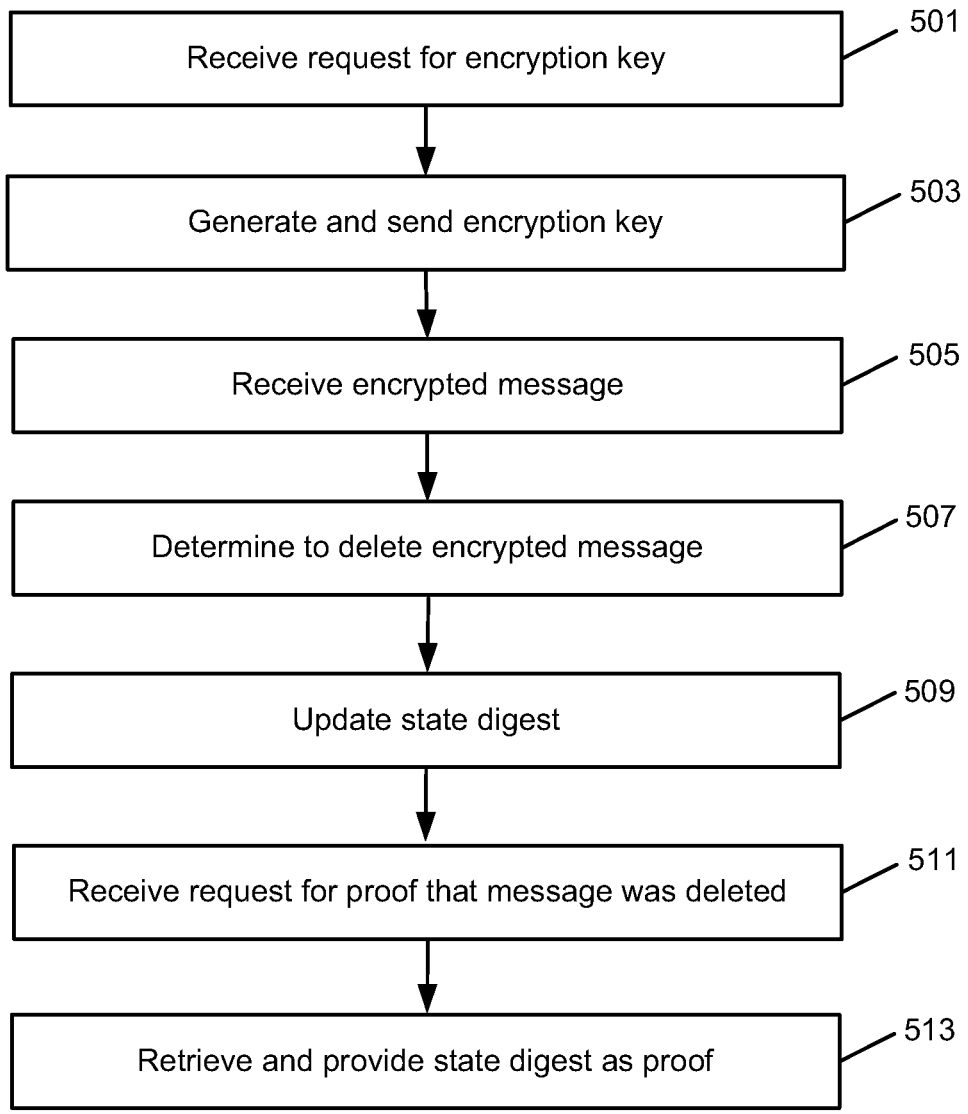
FIG. 5 is an operational flow of an implementation of a method for receiving a message and sending a proof that the received message was deleted.

FIG. 5 is an operational flow of an implementation of a method 500 for receiving a message and sending a proof that the received message was deleted. The method 500 may be implemented by one or both of a messaging application 115 and a cryptographically-secure component 150 of a node, for example.

A request for an encryption key is received at 501. The request may be received by a messaging application 115b of a receiving node 110b from a messaging application 115a of a sending node 110a through the network 120. The request may include an identifier of a message 130 that the messaging application 115a intends to send to the messaging application 115b. In some implementations, the identifier of a message 130 may comprise a hash of the message 130. In addition, the message 130 may have been signed using the certificate 235 of the cryptographically-secure component 150a of the sending node 110a.

An encryption key is generated and sent at 503. The encryption key 140 may be generated by a cryptographically-secure component 150b of the receiving node 110b and sent by the messaging application 115b to the messaging application 115a of the sending node 110a through the network 120. In some implementations, the encryption key 140 may be generated by the cryptographically-secure component 150b by retrieving a current state associated with the node 115b and appending the identifier of the message 130 to the retrieved state using an extend operation. The current state may be retrieved from a secure register 239 associated with the cryptographically-secure component 150b. The current state may be represented by a state digest. The cryptographically-secure component 150b may then generate an encryption key 140 that is bound to a new state that represents a state that the messaging application 115b will enter after reading the identified message 130.

An encrypted message is received at 505. The encrypted message 140 may be received by the messaging application 115b of the received node 110b from the messaging application 115a of the sending node 110a through the network 120. The message 130 may have been encrypted by the messaging application 115a using the encryption key 140.

A determination is made to delete the encrypted message at 507. The determination may be made by a user of the messaging application 115b of the receiving node 110b. For example, when the encrypted message was received, the message 130 may have been placed in a mailbox associated with the user. The user may determine not to read the encrypted message 130 by clicking, or otherwise selecting, the encrypted message 130 from the mailbox associated with the user and deleting the message 130 from the mailbox without reading it.

The state is updated at the 509. The state may be the state of the receiving node 110b and may be updated to reflect the proposed or actual deletion of the received message 130 by the cryptographically-secure component 150b. In some implementations, the state may be updated using an extend operation by cryptographically-secure component 150b. Because the state is updated to a state that is not the state that the encryption key was bound to by the cryptographically-secure component 150b, the messaging application 110b can no longer access the corresponding decryption key from the cryptographically-secure component 150b.

A request for proof that the message was deleted is received at 511. The request may be received by the messaging application 115b of the receiving node 110b from the messaging application 115a of the receiving node 110a through the network 120.

The requested proof is retrieved and sent at 513. The requested proof 160 may be sent by the messaging application 115b of the receiving node 110b to the messaging application 115a of the sending node 110a. The messaging application 115b may retrieve the proof 160 from the secure component 150b. In some implementations, the proof 160 may be a state digest and may be retrieved from the secure register 239 of the cryptographically-secure component 150b. The proof may be signed using the certificate 235 of the cryptographically-secure component 150b before sending the proof 160 to the messaging application 115b.

Figure 6:
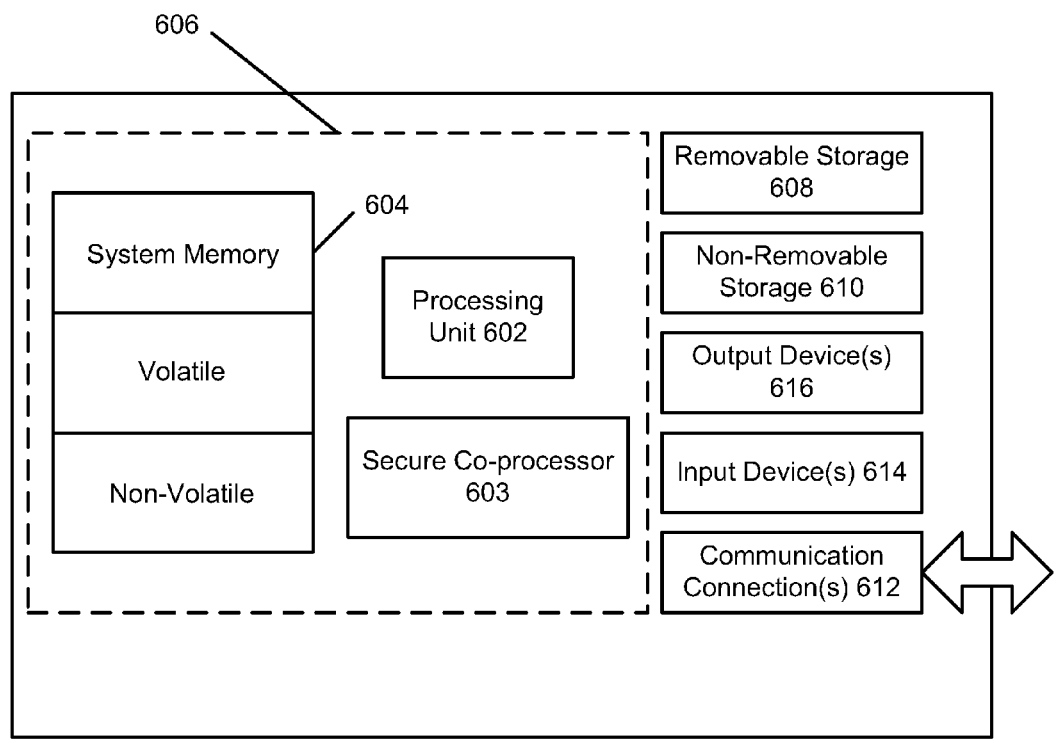
FIG. 6 is a block diagram of a computing system environment according to an implementation of the present system.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), smart phones, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610. The computing device 600 may further include a secure co-processor 603. The secure co-processor 603 may include a cryptographically-secure component similar to the cryptographically-secure component 150 illustrated in FIG. 2. The secure co-processor 603 may be a trusted platform module.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    generating a message at a sending computing device;
    sending a request for an encryption key from the sending computing device to a receiving computing device through a network, wherein the request includes an identifier of the message and wherein the identifier of the message comprises a hash of the message;
    receiving an encryption key by the sending computing device through the network, wherein the encryption key is bound to a state associated with reading the identified message and was generated by appending the hash of the message to a state of the receiving computing device and a certificate using a bind operation;
    verifying that the state that the encryption key is bound to is the state associated with reading the identified message by the sending computing device; and
    if the state that the encryption key is bound to is the state associated with reading the identified message:
        encrypting the message using the encryption key by the sending computing device; and
        sending the encrypted message to the receiving computing device by the sending computing device through the network.

2. The method of claim 1, further comprising:
    if the state that the encryption key is bound to is not the state associated with reading the identified message, generating an error.

3. The method of claim 1, wherein the encryption key is associated with a proof-of attestation, and verifying that the state that the encryption key is bound to is the state associated with reading the identified message comprises verifying that the state that the encryption key is bound to is the state associated with reading the identified message using the proof-of-attestation, wherein the proof-of-attestation was generated by a cryptographically-secure component of the receiving computing device.

4. The method of claim 1, further comprising:
    requesting a proof that the message was read by the receiving computing device; and
    receiving the proof that the message was read from the receiving computing device, wherein the proof that the message was read was generated by a cryptographically-secure component of the receiving computing device.

5. The method of claim 4, wherein the proof the message was read comprises a state digest.

6. The method of claim 1, further comprising:
    requesting a proof that the message was deleted by the receiving computing device; and
    receiving the proof that the message was deleted from the receiving computing device, wherein the proof that the message was deleted was generated by a cryptographically-secure component of the receiving computing device.

7. The method of claim 6, wherein the cryptographically-secure component comprises a trusted platform module.

8. A method comprising:
    receiving a request for an encryption key from a sending computing device by a receiving computing device through a network, wherein the request includes an identifier of a message and wherein the identifier of the message comprises a hash of the message;
    generating an encryption key by the receiving computing device, wherein the encryption key is generated by a cryptographically-secure component of the receiving computing device and is bound to a state associated with reading the identified message, and further wherein the encryption key is generated by appending the hash of the message to a current state of the receiving computing device and a certificate associated with the cryptographically-secure component using a bind operation;
    sending the generated encryption key to the sending computing device by the receiving computing device; and
    receiving an encrypted message by the receiving computing device from the sending computing device, wherein the encrypted message was encrypted by the sending computing device using the encryption key.

9. The method of claim 8, further comprising:
    determining to read the encrypted message by the receiving computing device;
    in response to the determining, updating a state digest by the receiving computing device to the state associated with reading the identified message, wherein the state digest is stored in the cryptographically-secure component of the receiving computing device;
    in response to the updating, receiving access to a decryption key by the receiving computing device from the cryptographically-secure component;
    decrypting the encrypted message by the receiving computing device using the decryption key; and reading the decrypted message by the receiving computing device.

10. The method of claim 9, further comprising:
receiving a request for proof that the receiving computing device read the message;
retrieving the state digest from the cryptographically-secure component; and
sending the state digest as proof that the receiving computing device read the message.

11. The method of claim 8, further comprising:
determining not to read the encrypted message by the receiving computing device; and
in response to the determining, updating a state digest by the receiving computing device to a deletion state associated with deleting the message, wherein the state digest is stored in the cryptographically-secure component of the receiving computing device.

12. The method of claim 11, further comprising:
receiving a request for proof that the receiving computing device deleted the message;
retrieving the state digest from the cryptographically-secure component; and
sending the state digest as proof that the receiving computing device deleted the message.

13. The method of claim 11, wherein the cryptographically-secure component comprises a trusted platform module.

14. The method of claim 13, wherein the state digest is stored in a secure register of the cryptographically-secure component.

15. A system comprising:
at least one computing device;
a cryptographically-secure component; and
a messaging application adapted to:
receive a request for an encryption key, wherein the request includes an identifier of a message and wherein the identifier of the message comprises a hash of the message;
generate an encryption key using the cryptographically-secure component, wherein the encryption key is bound to a state associated with reading the identified message, and further wherein the encryption key is generated by appending the hash of the message to a current state of the messaging application and a certificate associated with the cryptographically-secure component using a bind operation;
send the generated encryption key; and
receive an encrypted message, wherein the encrypted message was encrypted using the encryption key.

16. The system of claim 15, wherein the messaging application is further adapted to:
determine to read the encrypted message;
in response to the determination, instruct the cryptographically-secure component to update a state digest to the state associated with reading the identified message;
in response to the update, receive access to a decryption key by the cryptographically-secure component;
decrypt the encrypted message using the decryption key; and
read the decrypted message.

17. The system of claim 16, wherein the messaging application is further adapted to:
receive a request for proof that the message was read;
retrieve the state digest from the cryptographically-secure component; and
send the state digest as proof that message was read.

18. The system of claim 15, wherein the messaging application is further adapted to:
determine not to read the encrypted message; and
in response to the determining, instruct the cryptographically-secure component to update a state digest to a deletion state associated with deleting the message.

19. The system of claim 18, wherein the messaging application is further adapted to:
receive a request for proof that the message was deleted;
retrieve the state digest from the cryptographically-secure component; and
sending the state digest as proof that the message was deleted.

20. The system of claim 15, wherein the cryptographically-secure component is a trusted platform module.

* * * * *